United States Patent
Penzias et al.

[11] Patent Number: 5,937,054
[45] Date of Patent: Aug. 10, 1999

[54] APPARATUS FOR AND METHOD OF PROVIDING CONSUMERS WITH LOCAL ACCESS CARRIER

[76] Inventors: Arno Allan Penzias, 14E Kensington Rd., Chatham, N.J. 07928; Edward Stanley Szurkowski, 9 Collinwood Rd., Maplewood, N.J. 07040

[21] Appl. No.: 08/962,104

[22] Filed: Oct. 31, 1997

Related U.S. Application Data

[63] Continuation of application No. 08/531,508, Sep. 21, 1995, Pat. No. 5,715,305.

[51] Int. Cl.$^6$ .................................................. H04M 7/00
[52] U.S. Cl. ........................... 379/220; 379/112; 348/12; 348/13; 348/552
[58] Field of Search .................................... 379/112, 201, 379/207, 219, 220, 221; 348/12, 13, 552

[56] References Cited

U.S. PATENT DOCUMENTS

| | | | |
|---|---|---|---|
| 4,450,481 | 5/1984 | Dickinson | 380/7 |
| 5,289,536 | 2/1994 | Hokari | 379/221 |
| 5,400,395 | 3/1995 | Berenato | 379/114 |
| 5,499,241 | 3/1996 | Thompson et al. | 370/73 |
| 5,515,427 | 5/1996 | Carlsen et al. | 379/220 |

*Primary Examiner*—Daniel S. Hunter

[57] ABSTRACT

In accordance with the present invention, a selected local carrier may be operated by receiving a first signal and initializing provision of a second signal to a residential communications device in response to the first signal. More specifically, the first signal is, e.g., indicative of a particular local carrier (e.g., a first local carrier or a second local carrier) being chosen as the selected local carrier from a group of local carriers. The group of local carriers comprises the first local carrier and the second local carrier. Illustratively, the second signal is a dialtone signal, the first local carrier is a local exchange provider and the second local carrier is an interactive television provider. Various devices capable of choosing the selected local carrier are also disclosed. Advantageously, the method provides consumers with a choice of local access carriers.

3 Claims, 3 Drawing Sheets

APPARATUS FOR AND METHOD OF PROVIDING CONSUMERS WITH LOCAL ACCESS CARRIER

This is a continuation of application Ser. No. 08/531,508 filed Sep. 21, 1995, U.S. Pat. No. 5,715,305.

FIELD OF THE INVENTION

The present invention relates to residential communications (e.g., telephonic communications). More specifically, the present invention relates to providing a residential consumer with of choice of local access carriers for communications services.

BACKGROUND OF THE INVENTION

Increasing competition in the provision of communication services is a world-wide trend. In the United States, competition has evolved to the point that many communication services can be obtained from a number of different communication service providers. For example, basic long distance services and business oriented services, such as sophisticated outbound calling programs, may be obtained from numerous communication service providers. In fact, in terms of long distance services, devices such as PBXs ("private branch exchanges"), in addition to devices described in U.S. Pat. No. 4,585,904 ("the '904 patent"), have the ability to change service providers in real time depending, for example, upon the most cost efficient rate. However, there is no analogous competition among residential local access carriers. For example, each person living in New Jersey that desires residential telephone service is forced to use the services of the same local access provider. There simply is no choice.

SUMMARY OF THE INVENTION

In accordance with the present invention, a selected local carrier may be operated by receiving a first signal and initializing provision of a second signal to a residential communications device in response to the first signal. More specifically, the first signal is, e.g., indicative of a particular local carrier (e.g., a first local carrier or a second local carrier) being chosen as the selected local carrier from a group of local carriers. The group of local carriers comprises the first local carrier and the second local carrier. The second local carrier is communicably coupled with a set top box. As used herein, device A is said to be "communicably coupled" to device B if device A and device B are capable of communicating with each other regardless of the number of devices, if any, interposed between device A and device B. Illustratively, the second signal is a dialtone signal, the first local carrier is a local exchange provider and the second local carrier is another service provider (e.g., an interactive television provider, a video service provider, a wireless network operator, etc. . . . ). Various devices capable of choosing the selected local carrier are also disclosed.

Advantageously, the method provides consumers with a choice of local access carriers on, e.g., a call-by-call basis based upon, e.g., cost, quality, other factors, etc. . . .

Also advantageously, the group of local carriers may comprise local carriers in addition to the first local carrier and the second local carrier.

Other advantages of the present invention will become apparent to those skilled in the art from the remainder of the specification.

DETAILED DESCRIPTION

Figure 1:
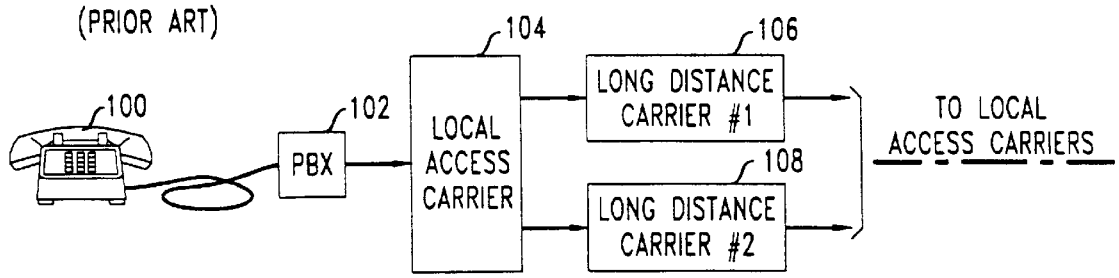
FIG. 1 shows a known scheme for providing a choice of long distance carriers to a telephone.

Introduction:

The present invention will be described in the context of interaction between a typical residential telephone system and a set top box of an ITV system or a residential switching box. As used herein, the term "residential communications device" means all residential devices that have a telephone jack. Examples of residential communications devices are conventional telephones, cordless telephones, videophones, and modems. However, the term "residential communications device" does not include televisions and devices which are usually used away from home (e.g., a car telephone). Further, as used herein, the term "local carrier" shall mean a carrier that is coupled to at least one long distance carrier.

The details of the set top box are disclosed in U.S. patent application Ser. No. 07/965,492 entitled "Interactive Television Converter" filed Oct. 23, 1992 and assigned to the assignee of the present invention is incorporated herein by reference as if set forth in its entirety, now U.S. Pat. No. 5,418,559, issued on May 23, 1995. A patent and a number of patent applications which collectively assist in the understanding of ITV systems and the routing of information therein, namely U.S. Pat. 5,373,288 entitled "Initializing Terminals In A Signal Distribution System" issued Dec. 13, 1994; U.S. patent application Ser. No. 08/029,205 entitled "Method And Apparatus For The Coding And Display Of Overlapping Windows With Transparency" filed Mar. 10, 1993 now abandoned; U.S. patent application Ser. No. 07/965,493 entitled "Interactive Television Multicasting" filed Oct. 23, 1992 now U.S. Pat. No. 5,446,490, issued Apr. 29. 1995; U.S. patent application Ser. No. 07/997,985 entitled "Program Server For Interactive Television System" filed Dec. 28, 1992 now U.S. Pat. No. 5,442,389, issued Aug. 15, 1995; U.S. patent application Ser. No. 08/056,973 entitled "Integrated Television Services System" filed May 3, 1993 now U.S. Pat. No. 5,639,449, issued Jul. 23, 1996; U.S. patent application Ser. No. 08/056,974 entitled "System For Composing Multimedia Signals For Interactive Television Services" filed May 3, 1993 now abandoned; and U.S. patent application Ser. No. 08/175,059 entitled "Method Of Controlling Multiple Processes Using Finite State Machines" filed Dec. 29, 1993 now U.S. Pat. No. 5,504,896, issued Apr. 2, 1996, all of which are assigned to the assignee of the present invention, are also incorporated by reference as if set forth in their entirety. The '904 patent is also incorporated herein by reference as if set forth in its entirety.

The functions of the "processors" described herein may be provided through the use of either shared or dedicated hardware, including, but not limited to, hardware capable of executing software. Thus, a processor may be a hardwired circuit and/or a circuit capable of executing software. Further, the illustrative embodiment may comprise digital signal processor (DSP) hardware such as the AT&T DSP16 or DSP32C, read-only memory (ROM) for storing software for performing the operations discussed below, and random access memory (RAM) for storing DSP results.

Referring to FIG. 1, a telephone 100 is connected to a PBX 102. The PBX 102 is connected to a local access carrier 105 via lines 104. The PBX 102 is capable of at least beginning the process of selecting between, e.g., two long distance carriers, e.g., 106 and 108. Either long distance carrier 106 or long distance carrier 108 will carry calls to and from the local access carrier 105. However, regardless of whether long distance carrier 106 or long distance carrier 108 carries calls, the local access carrier 105 does not change. Thus, a call placed with telephone 100 must be carried by local access carrier 105. Another scheme which is not shown in FIG. 1 but is a variation thereof, is typically used by extremely large commercial customers (e.g., an airline reservation number or a securities brokerage business) to handle a large number of calls. This variation provides for the PBX 102 to be directly coupled to both long distance carrier 106 and long distance carrier 108. In this scheme, there is no local access carrier. Therefore, regardless of the environment in which the PBX is used, no choice of local access carrier 104 is provided and consumers, especially residential consumers as opposed to businesses, are forced to choose between paying whatever local access fees are charged by the local access carrier 102 or not having telephone service.

Illustrative Embodiments:

Three different environments in which the present invention may be implemented will now be described. Three different residences may be thought of as comprising a different one of the three different environments. Thus, the headings "House #1", "House #2", and "House #3" will be used to describe the three different environments and correspond to FIGS. 2, 4, and 6, respectively. In addition to describing each environment, we will describe in more detail the manner in which a selected local carrier is chosen from a group of local carriers for each of the environments shown in FIGS. 2, 4, and 6. This will be described with reference to FIGS. 3, 5, and 7, respectively.

Figure 2:
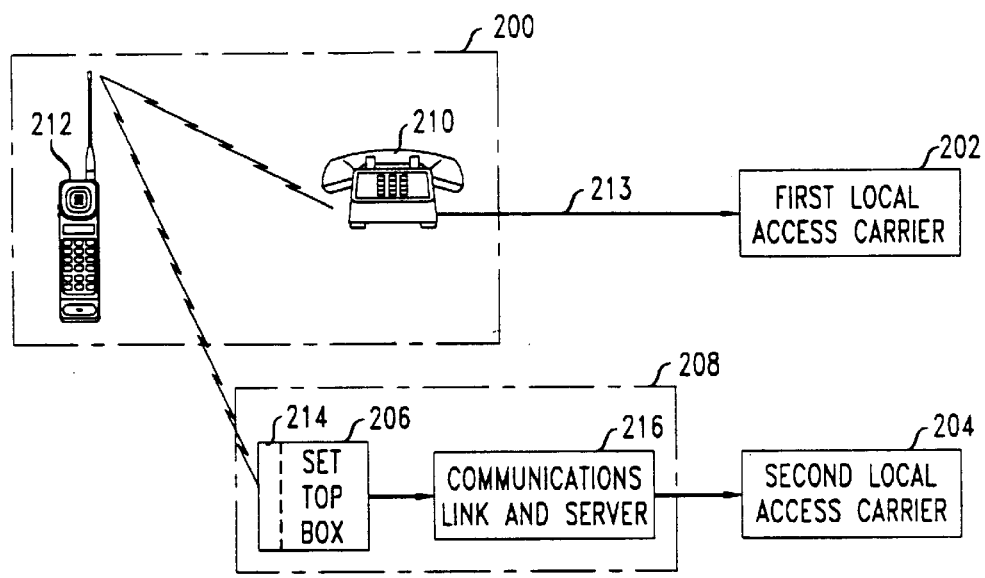
FIG. 2 shows a first embodiment of the present invention which provides a choice of local access carriers to a cordless telephone.

House #1:

Referring to FIG. 2, an embodiment of the present invention capable of allowing communication between a cordless telephone 200 and a first local access carrier 202 or a second local access carrier 204 is shown. More specifically, FIG. 2 shows the interplay of two systems, namely a cordless telephone 200 and a set top box 206 of an ITV system 208.

The cordless telephone 200 may communicate with the first local access carrier 202. The cordless telephone 200 comprises a base 210 and a handset 212. The base 210 is coupled to the first local access carrier 202 via a telephone line 213. The base 210 and the first local access carrier 202 communicate with each other in a well known manner. Further, the manner in which the base 210 and the handset 212 communicate with each other is well known.

Figure 4:
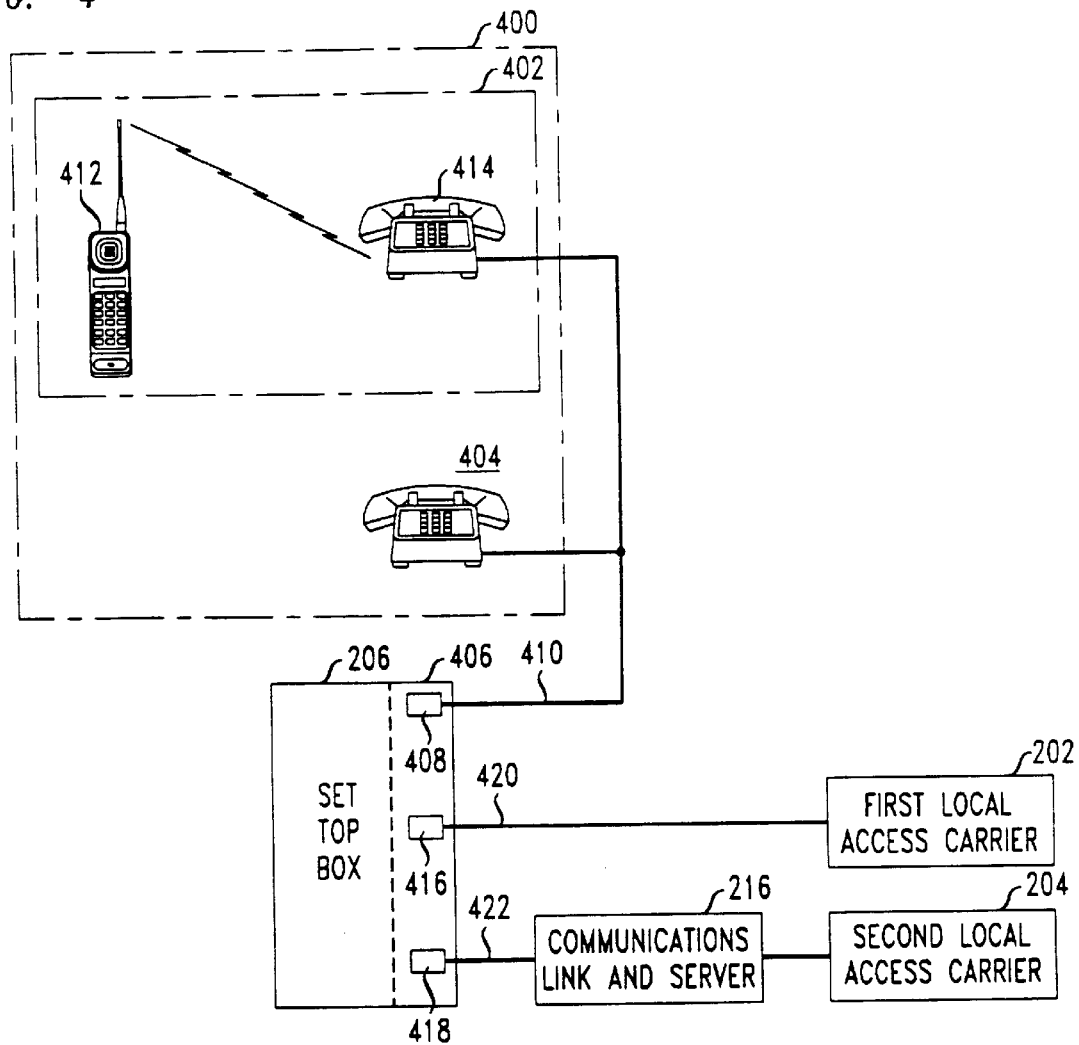
FIG. 4 shows a second embodiment of the present invention which provides a choice of local access carriers to all telephones using a given phone number, regardless of whether or not the telephones arm cordless.
Figure 6:
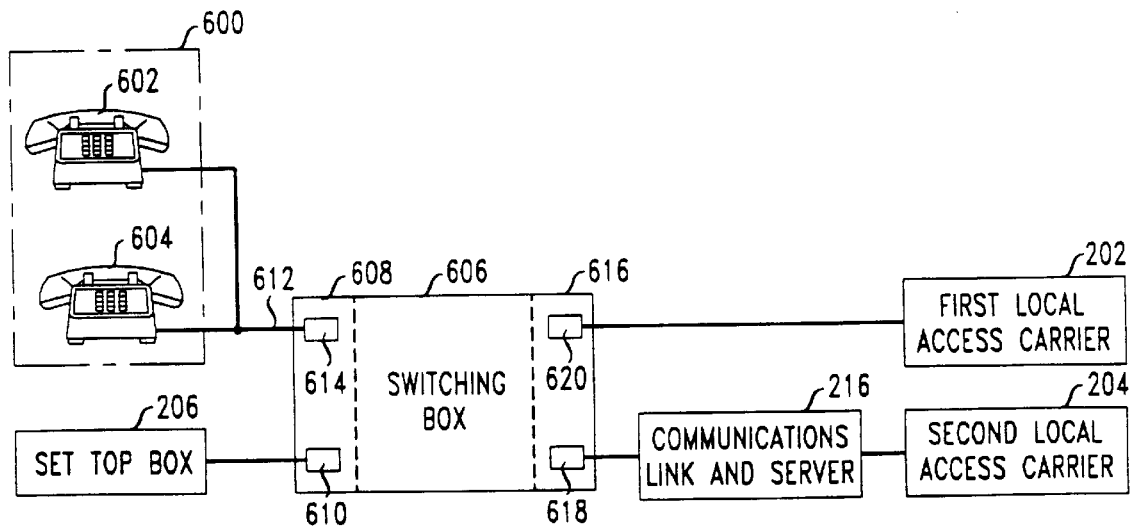
FIG. 6 shows a third embodiment of the present invention which also provides a choice of local access carriers to all telephones using a given phone number, regardless of whether or not the telephones are cordless.

The cordless telephone 200 may also communicate with the second local access carrier 204. The set top box 206 may be a set top box as described in U.S. patent application Ser. No. 07/965,492 entitled "Interactive Television Converter" now U.S. Pat. No. 5,418,559, issued May 23, 1995 with additional features. For example, the set top box 206 comprises a wireless transceiver 214 for communicating with the handset 212 of the cordless telephone 200. The set top box 202 is coupled to a second local access carrier 204 via a communications link and server 216. It should be noted that the communications link and server 216 and the second local access carrier 204 are shown in FIGS. 2, 4, and 6 as being separate physical structures. Such separate physical structures may occur if, e.g., a company desires to provide consumers with a local access choice. For example, if the company has access to at least one long distance carrier, it may enter into a business relationship with an ITV company that already has access to local homes but does not have access to at least one long distance company. This situation would not only benefit the consumer but would also provide the ITV company with access to a long distance carrier (via the company) while also providing the company with access to homes (via the ITV company). However, those skilled in the art will appreciate that the ITV company may, in fact, function as a local access carrier. In this instance, the communications link and server 216 and the second local access carrier 204 would be operated by the ITV company. In fact, the ITV company may have a long distance carrier connected to its communications link and server 216 in which case the function of the second local access carrier 204 may be thought of as being embedded in the communications link and server 216.

Figure 3:
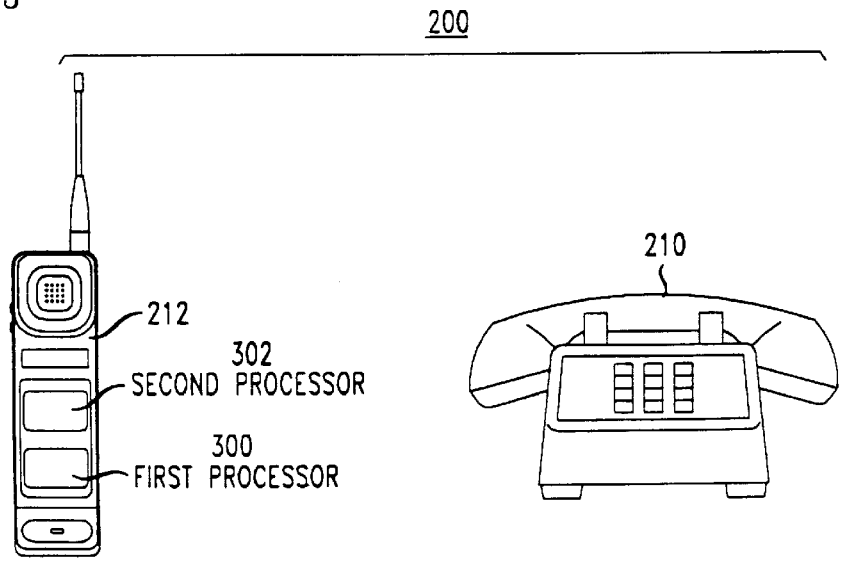
FIG. 3 shows a detailed view of a portion of the cordless telephone of FIG. 2.

Referring to FIGS. 2 and 3, each call must be handled by either the first local access carrier 202 or the second local access carrier 204. The cordless telephone 200 comprises a first processor 300 that chooses a selected local carrier from the group of local carriers. It should be noted that although each of the environments described herein will be described as having two local access carriers, those skilled in the art will appreciate that there are many environments in which the present invention may be used that have more than two local access carriers. The cordless telephone 200 also has a second processor 302 that initializes the routing of the call to the selected local carrier.

There are two steps implemented by the first processor 300 in choosing the selected local carrier. The two steps will now be described with reference to FIGS. 2 and 3.

First, the first processor 300 Determines whether, e.g., the set top box 206 has the present ability to couple the cordless telephone 200 to the second local access carrier 204 via the communications link and server 216. This is accomplished by having the set top box 206 make an initial determination as to its ability to offer local access based upon the nature of the call to be made (e.g., local call v. long distance call) and bandwidth available between the cordless telephone 200 and the second local access carrier 204. The nature of the call is based upon a set of numbers entered by a user of the handset. More specifically, upon powering up the handset 212 (e.g., going "off hook"), the handset 212 not only communicates with the base 210 but also communicates with the wireless transceiver 214 of the set top box 206. Thus, the wireless transceiver 214 is able to monitor the set of numbers. If the set of numbers indicates that the user desires to make a long distance call (e.g., the first four numbers entered are "1" plus an area code) and there is enough bandwidth, the set top box 206 determines that it has the ability to offer local access via the communications link and server 216 and the second local access carrier 204. If, however, the set top box 206 determines that a user of the cordless telephone 200 desires to make a local call (e.g., the first three numbers in set of numbers is a local exchange) or does not have enough bandwidth, the second local access carrier 204 is generally precluded from being the selected local carrier.

Second, the first processor 300 determines the local carrier to which the cordless telephone 200 will be linked. The set top box 206 transmits a signal via its wireless transceiver 214 to the handset 212 indicating the ability or inability to provide local access to the cordless telephone 200. The cordless telephone, based upon the signal, processes the signal in the first processor 300 and determines whether local access will be provided by the first local access carrier 202 or the second local access carrier 204. If both the first local access carrier 202 and the second local access carrier 204 are currently available to provide local access, the determination may be done based upon cost. Such costs could be stored in memory in, e.g., a look up table. Those skilled in the art will appreciate that there are numerous ways in which the determination may be made other than cost. For example, the determination may be made based upon customer preference such as percentages of calls, percentages of costs, time of day, identification of the called party, etc.

The first processor 300 identifies to the second processor 302 the local carrier to which the cordless telephone 200 will be linked. The second processor initializes the routing of the call to the selected local carrier. After initialization of the routing of the call, the selected local carrier initialize provision of a signal (e.g., a dialtone signal) to the cordless telephone 200.

House #2:

Referring to FIG. 4, an embodiment of the present invention capable of allowing communication between any one of a set of telephones 400 and a first local access carrier 202 or a second local access carrier 204 is shown. The set of telephones 400 comprises a cordless telephone 402 and a corded telephone 404. More specifically, FIG. 4 shows the interplay of two systems, namely the set of telephones 400 and the set top box 206 of the ITV system 208.

Illustratively, the set top box 206 has a set of three ports 406. A first port 408 is coupled to a telephone line 410 of a residence. Both the corded telephone 404 and the cordless telephone 402 communicate over the telephone line 410. The cordless telephone 402 comprises a handset 412 and a base 414. A second port 416 is coupled to a first local access carrier 202. A third port 418 is coupled to a second local access carrier 204 via communications link and server 216.

Again referring to FIG. 4, all telephone calls are routed through the set top box 206. The first local access carrier 202 is coupled to the telephone line 410 via the set top box 206. However, because the first local access carrier 202 is used for telephone calls only (as opposed to ITV), those skilled in the art will appreciate that the telephone line 410 connected to the first port 408 may be similar to at least a portion of a line 420 coupling the second port 416 to the first local access carrier 202 (except in cases wherein, e.g., fiber optic cable are used to carry signals to and from the home). On the other hand, a line 422 emanating from the third port 418 of the set top box 206 may be something other than a telephone line because the line 422 will also be used for ITV. Thus, at least a portion of the line 422 may be coaxial cable, fiber optic cable, other types of communications media as are well known by those skilled in the art.

Figure 5:
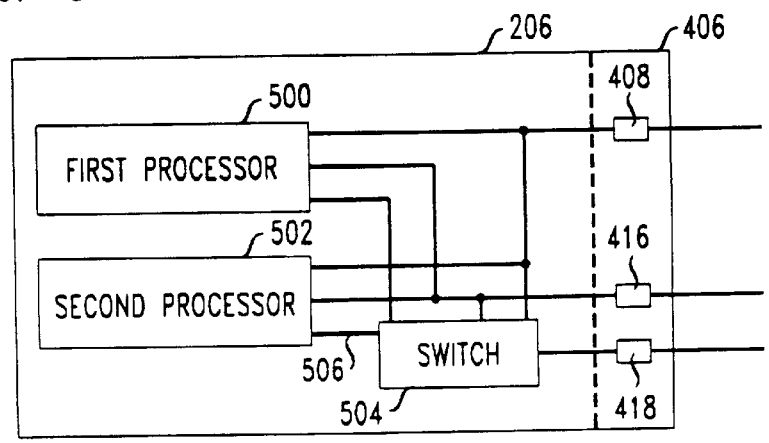
FIG. 5 shows a detailed view of a portion of a set top box that may be used in conjunction with FIG. 4.

As shown in FIG. 5, the set top box 206 comprises a first processor 500 and a second processor 502. The first processor chooses the selected local carrier from the group of local carriers. The second processor 502 initializes the routing of the call to the selected local carrier. Both the first processor 500 and the second processor 502 are coupled to both the second port 416 and the third port 418.

There are two steps implemented by the first processor 500 in choosing the selected local carrier. The two steps will now be described with reference to FIGS. 4 and 5.

First, the first processor 500 determines whether, e.g., the set top box 206 has the present ability to couple the cordless telephone 200 to the second local access carrier 204 via the communications link and server 216. The first processor 500 makes an initial determination as to the set top box's 206 ability to offer local access based upon the nature of the call to be made and available bandwidth. Again, the nature of the call is based upon a set of numbers entered by a user of the handset. The set top box 206 receives the set of numbers via the telephone line 410.

Second, the first processor 500 determines the local carrier to which the corded telephone 404 will be linked. As mentioned above, the determination may be done based upon, e.g., cost as stored in a look up table.

The first processor 500 identifies to the second processor 502 the local carrier to which the corded telephone 404 will be linked. The second processor initializes the routing of the call to the selected local carrier. This initialization may be implemented with a switch 504 coupled to a control line 506 of the second processor 502. The switch is also coupled to the first port 408, the second port 416, and the third port 418 of the set top box 206. After initialization of the routing of the call, the selected local carrier initializes provision of a signal (e.g., a dialtone signal) to the corded telephone 404 via the first port 408 of the set top box 206.

House #3:

Referring to FIG. 6, an embodiment of the present invention capable of allowing communication between any one of a set of telephones 600 and the first local access carrier 202 or the second local access carrier is shown. The set of telephones 600 comprises a plurality of corded telephones (e.g., 602 and 604). More specifically, FIG. 6 shows the interplay of two systems, namely the set of telephones 600 and a switching box 606. The switching box 606 may be advantageously deployed inside a home in close proximity to the location at which an ITV cable enters the home.

Illustratively, the switching box 606 has a first set of ports 608 that communicate with devices in House #3. A first port 610 is coupled to a telephone line 612 of a residence. The set of telephones 600 communicate over the telephone line 612. The switching box 606 also has a second port 614 coupled to the set top box 206. The switching box also has a second set of ports 616 that communicate with equipment external to House #3. A first port 620 is coupled to a first local access carrier 202. A second port 618 is coupled to a second local access carrier 204 via communications link and server 216.

Figure 7:
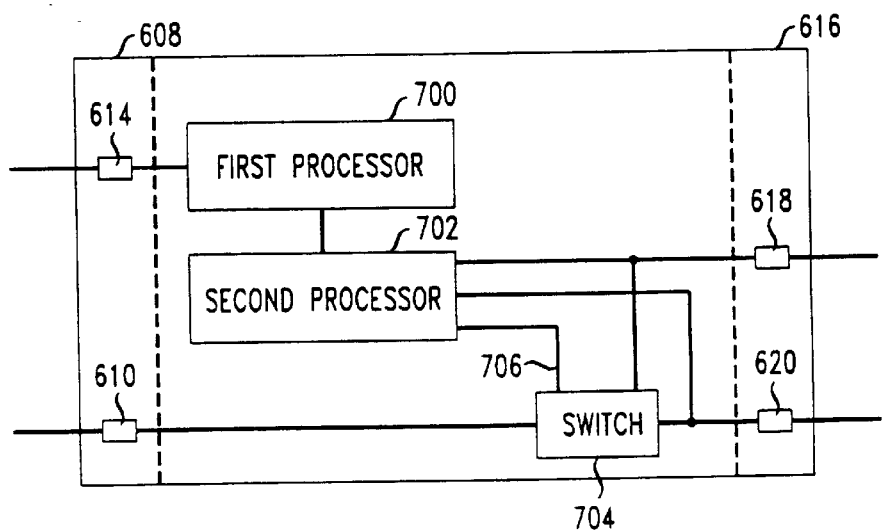
FIG. 7 shows a detailed view of a portion of a switch that may be used in conjunction with FIG. 6.

Referring to FIGS. 6 and 7, all telephone calls are routed through the switching box 606. The switching box 606 comprises a first processor 700 that chooses the selected local carrier from the group of local carriers. The switching box 606 also has a second processor 702 that initializes the routing of the call to the selected local carrier. Also, the switching box 606 comprises a switch 704 which is controlled by a control line 706 from the second processor 702. The elements of the switching box 606 are connected as shown in FIG. 7.

There are two steps implemented by the first processor 700 in choosing the selected local carrier. The two steps will now be described with reference to FIGS. 6 and 7.

First, the switching box 606 determines whether, e.g., the switching box 606 has the present ability to couple, e.g., telephone 604 to the second local access carrier 204 via the communications link and server 216. The first processor 700 makes an initial determination as to its ability to offer local access based upon the nature of the call to be made and available bandwidth. Again, the first processor 700 knows the nature of the call based upon a set of numbers entered by a user of the telephone 604.

Second, the first processor determines the local carrier to which the telephone 604 will be linked. As mentioned above, the determination may be done based upon, e.g., cost as stored in a look up table.

The first processor 700 identifies to the second processor 702 the local carrier to which the telephone 604 will be linked. The second processor 702 initializes the routing of the call to the selected local carrier. The initialization may be implemented with the switch 704 under control of the second processor 702 and the control line 706. After initialization of the routing of the call, the selected local carrier initializes provision of a signal (e.g., a dialtone signal) to the corded telephone (e.g., 604) via the first port 610 of the switching box 606.

Three different embodiments of the invention have been described. However, many variations of the embodiments and the environments in which they may be used will be apparent to those skilled in the art. For example, with respect to embodiments of the invention, the first processor and the second processor, although discussed as separate processors for pedagogical purposes, may be combined into a single processor having a first processing means for executing a first function and a second processing means for executing a second function. However, as noted above, the first processor means and the second processor means may also be two physically separate processors. Further, the first processor (e.g., 300, 500, 700) may not identify to the second processor (e.g., 302, 502, 702) the local carrier to which the telephone will be linked in all situations. If no identification is made, the second processor may "time out" after a predetermined amount of time that the telephone (e.g., 212, 412, 602) has been "off-hook" and, by default, assign the call to the first local access carrier 202. Also, for example, in determining the appropriate local carrier to which to route the call, the second processor may consider cost, user preference, and/or other factors as are well known in the art. Also, although the illustrative embodiments described above preclude the second local access carrier 204 from carrying a local call, there are circumstances under which the carrying of a local call by the second local access carrier 204 would be desirable; For example, if both the calling party and the called party are communicably coupled with the same ITV provider, it may be desirable for the second local access carrier 204 to carry the call. Another example of when it is desirable for the second local access carrier 204 to carry a local call may occur if it is less expensive for a calling party to pay for a call to a called party which is routed through an ITV provider, a long distance carrier, and the first local access carrier 202 as opposed to through the first local access carrier (due to, e.g., high prices charged by the first local access carrier for handling the calling party's call). Another variation, with respect to FIGS. 2 and 3, is that the first processor 300 and second processor 302 of the cordless telephone 200 may be implemented in the base 210 rather than the handset 212. Finally, the first processor and the second processor may be located in different devices than those shown. For example, in FIGS. 2 and 3, the first processor 300 and the second processor 302 may be located within the set top box 206. Those in the art will appreciate that this may necessitate the need for communications between the set top box 206 and the base 210 via, e.g., a telephone line. With respect to environments within which the invention may be used, cable television operators may expand the capabilities of their networks to offer telephony, data, and video services in competition with traditional local access carriers. Wireless network operators may also offer residential telephony services. Over time, consumers at home may have the option of purchasing local communication service from a local access carrier, a cable television operator, or a wireless network operator. Thus, the invention is defined by the appended claims.

What we claim is:

1. A method of communicating with both a first local carrier communicably coupled with a set top box and a second local carrier said method comprising:

a) choosing a selected local carrier from a group of local carriers using a first processor means and at least one communication between a residential communications device and the set top box; and b) initializing a routing of the call by a second processor means to the selected local carrier.

2. The method of claim 1, further comprising the steps of:

i) determining based upon an entire telephone number that the set top box is unsuited to provide access to the first local carrier for said call and:

ii) choosing a second local carrier as the selected local carrier.

3. The method of claim 1, further comprising the steps of:

iii) receiving a signal from the set top box indicating an ability of the set top box to provide access to the first local carrier; and iv) choosing the first local carrier as the selected local carrier.

* * * * *